United States Patent
Lu et al.

(10) Patent No.: US 8,578,676 B2
(45) Date of Patent: Nov. 12, 2013

(54) TOWER BARREL, WIND TOWER AND WIND POWER PLANT FOR WIND ELECTRIC POWER GENERATION

(75) Inventors: Jizhuang Lu, Beijing (CN); Qin Zhang, Beijing (CN); Fang Chen, Beijing (CN); Huimin He, Beijing (CN)

(73) Assignee: Sinovel Wind Group Co., Ltd., Beijing (CN)

( * ) Notice: Subject to any disclaimer, the term of this patent is extended or adjusted under 35 U.S.C. 154(b) by 0 days.

(21) Appl. No.: 13/501,777

(22) PCT Filed: Oct. 25, 2010

(86) PCT No.: PCT/CN2010/001690
§ 371 (c)(1),
(2), (4) Date: Apr. 13, 2012

(87) PCT Pub. No.: WO2011/050570
PCT Pub. Date: May 5, 2011

(65) Prior Publication Data
US 2012/0199378 A1    Aug. 9, 2012

(30) Foreign Application Priority Data
Oct. 27, 2009    (CN) .......................... 2009 1 0236600

(51) Int. Cl.
*E04H 12/00*    (2006.01)

(52) U.S. Cl.
USPC .......................................... 52/651.07; 52/843

(58) Field of Classification Search
USPC ............ 52/651.01, 651.07, 651.08, 831, 834, 52/843, 849, 845, 848, 726.4, FOR. 100, 52/FOR. 116, FOR. 118, FOR. 119; 174/45 R, 2, 3; 138/120, 135, 155
See application file for complete search history.

(56) References Cited

U.S. PATENT DOCUMENTS

| | | | |
|---|---|---|---|
| 7,530,325 B2 * | 5/2009 | Swenson et al. | 116/173 |
| 8,201,378 B2 * | 6/2012 | Meiners | 52/651.04 |
| 8,230,660 B2 * | 7/2012 | Muhlhauser | 52/745.17 |

FOREIGN PATENT DOCUMENTS

| | | |
|---|---|---|
| CN | 101701574 A | 5/2010 |
| EP | 1921311 A1 | 5/2008 |

(Continued)

OTHER PUBLICATIONS

Notification to Grant Patent Right from the Chinese office in Chinese patent application 2009102366007.
Office action from the Chinese office in Chinese patent application 2009102366007.
International Search Report for PCT/CN2010/001690.

(Continued)

*Primary Examiner* — William Gilbert
*Assistant Examiner* — Gisele Ford
(74) *Attorney, Agent, or Firm* — The PL Law Group, PLC (57) ABSTRACT

A tower barrel for wind electric power generation includes a barrel wall for supporting a wind turbine generator system, a torsion cable direction-changing device which is placed in the tower barrel and fixed on the barrel wall for holding the cable from the wind turbine generator system and restraining the torsion of the cable, and cable clamps which are placed under the torsion cable direction-changing device and connected to the barrel wall for securing the cable. The torsion cable direction-changing device includes a beam and two supports for the beam, the supports are fixed on the barrel wall. The torsion cable direction-changing device in the tower barrel improves the safety of the cable, and so improves the safety of the wind turbine generator system.

14 Claims, 7 Drawing Sheets

(56) References Cited

FOREIGN PATENT DOCUMENTS

| | | |
|---|---|---|
| JP | 2004-84518 A | 3/2004 |
| JP | 2005-122912 A | 5/2005 |
| JP | 2008-298051 A | 12/2008 |

OTHER PUBLICATIONS

English Abstract of CN101701574A.
English Abstract of JP2004-84518.
English Abstract of JP2008-298051.
English Abstract of JP2005-122912.

* cited by examiner

TOWER BARREL, WIND TOWER AND WIND POWER PLANT FOR WIND ELECTRIC POWER GENERATION

CROSS REFERENCE TO RELATED APPLICATION

The present application claims all benefits accruing under 35 U.S.C. §365(c) from the PCT International Application PCT/CN2010/001690, with an International Filing Date of Oct. 25, 2010, which claims the priority based on CN200910236600.7 filed on Oct. 27, 2009, the entire contents of which are incorporated herein by reference.

TECHNICAL FIELD OF THE INVENTION

This invention relates to the technical field of wind electric power generation, particularly to a tower barrel, a wind tower and a wind power plant for wind electric power generation.

BACKGROUND

Harmful gases and dust emitted from thermal power plants not only pollute the atmosphere and change the climate seriously, but also cause different types of natural disaster and exacerbate energy exhaustion. To reduce pollution from thermal power stations and to ease the pressure of energy shortage, the countries all over the world are actively developing wind power.

China's wind energy resources are very rich, according to incomplete statistics, China's wind power available can reach 2.53 billion megawatts (MW).

As the wind power technology continues to mature and the cost of power generation continues to lower, wind power has become one of the most important sources of electricity consumed by people. Wind power relies mainly on the wind turbine generator system to generate electricity by the action of the wind.

The wind turbine generator system is placed on a wind tower, when the wind turbine generator system works normally, a yawing system causes a wind rotor always aligned with the wind direction to operate. Through a driving device and a yawing bearing, the yawing system of the wind turbine generator system realizes the relative rotation of a cell and the wind tower and redirects a wind turbine, to ensure the wind rotor of the wind turbine generator system always windward.

In the prior art, the wind tower includes a tower barrel and a tower base. The power cable(s) and the control cable(s) and the like of the wind turbine generator system extend from the top of the wind turbine to the bottom of the tower barrel, i.e. the tower base. The middle parts of the power cable(s) and the control cable(s) are secured by single row cable clamps or double row cable clamps.

The problems existing in the prior art are that when the wind turbine yaws normally, it will causes the foregoing cables to rotate together with it, which causes the cables to twist and wind. The cables wound with each other will stretch along the tower barrel with the action of yawing. Then, once the angle of the normal clockwise or anticlockwise yawing is too big, some of the stretched cables may deform largely until they are broken due to the fixture of the cable clamps, which brings significant potential safety hazard to the wind turbine generator system. Especially for the wind turbine generator system in the order of MW, the number of the power cable(s) and the control cable(s) is greater, and the problems of the potential safety hazard are more serious, which should be solved immediately.

SUMMARY OF THE INVENTION

Embodiments of the invention provide a tower barrel, a wind tower and a wind power plant for wind electric power generation, to improve the safety of the wind turbine generator system.

Embodiments of the invention provide a tower barrel for wind electric power generation comprising:
a barrel wall for supporting a wind turbine generator system,
a torsion cable direction-changing device which is placed in the tower barrel and fixed on the barrel wall for holding the cables from the wind turbine generator system and restraining the torsion of the cable, and
cable clamps which are placed under the torsion cable direction-changing device and connected to the barrel wall for securing the cable,
the torsion cable direction-changing device comprising a beam and two supports for supporting the beam, and the supports are fixed on the barrel wall.

Embodiments of the invention further provide a wind tower for wind electric power generation comprising the foregoing tower barrel.

Embodiments of the invention further provides a wind power plant comprising a wind turbine generator system, wherein the wind power plant further comprising the foregoing wind tower for supporting the wind turbine generator system.

In the foregoing technical solutions, the torsion cable direction-changing device in the tower barrel supports downward hanging cables, and causes the torsion of the cables due to the yawing of the wind turbine to occur only before they are wound with the torsion cable direction-changing device, which restrains the torsion of the cables, prevents the accidents caused by the break of the cables due to the torsion thereof, improves the safety of the cables, and so improves the safety of the wind turbine generator system, thereby avoids the occurrence of potential safety hazards.

The technical solutions of the present invention will now be more fully described in the following embodiments with the accompanying drawing figures.

DETAILED DESCRIPTION OF THE EMBODIMENTS

Figure 1:
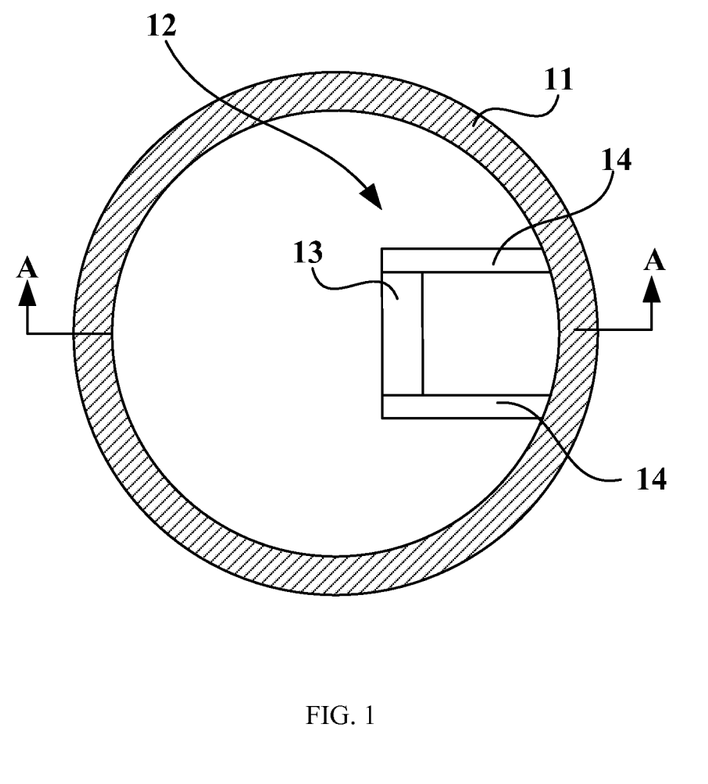
FIG. 1 schematically illustrates the configuration of a tower barrel for wind electric power generation according to an embodiment of the present invention.
Figure 2:
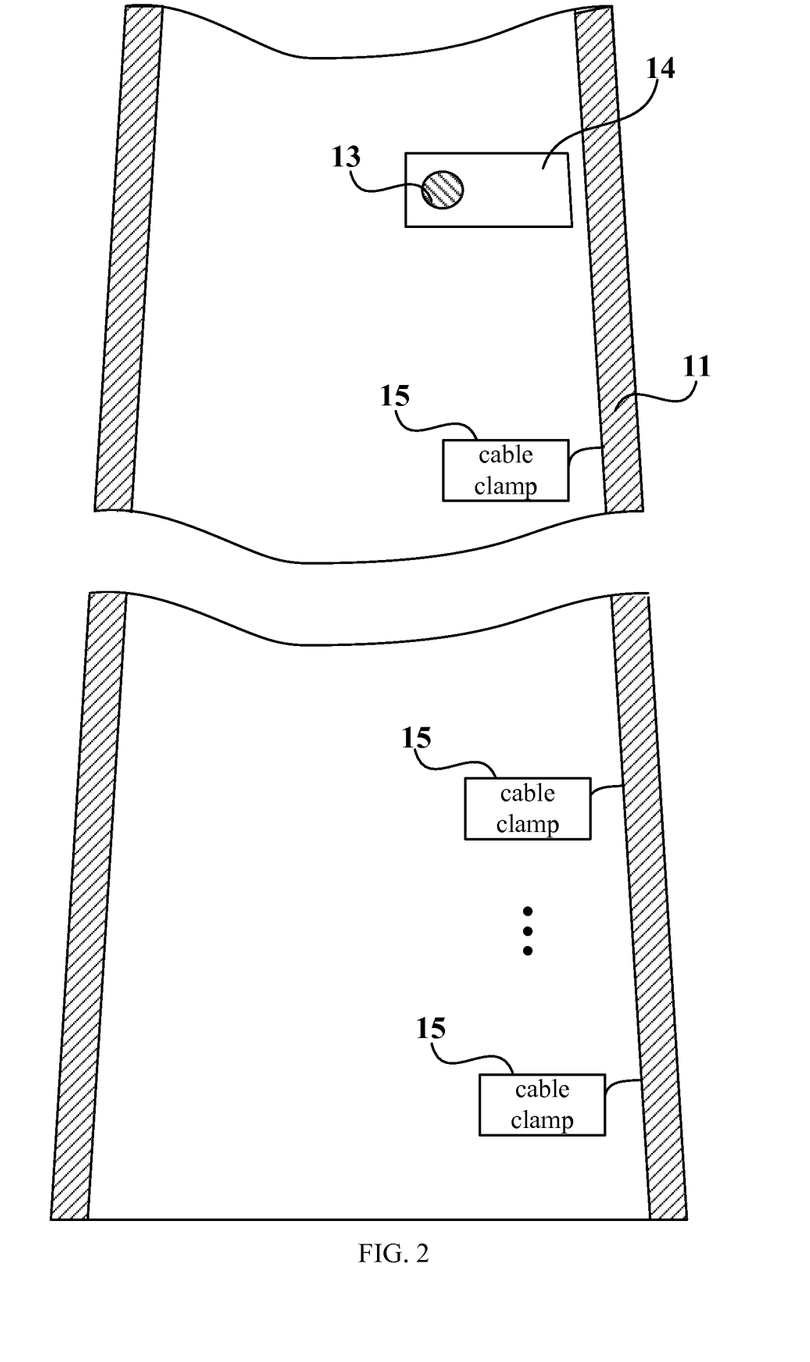
FIG. 2 schematically illustrates the tower barrel as illustrated in FIG. 1 in the direction of AA.
Figure 3:
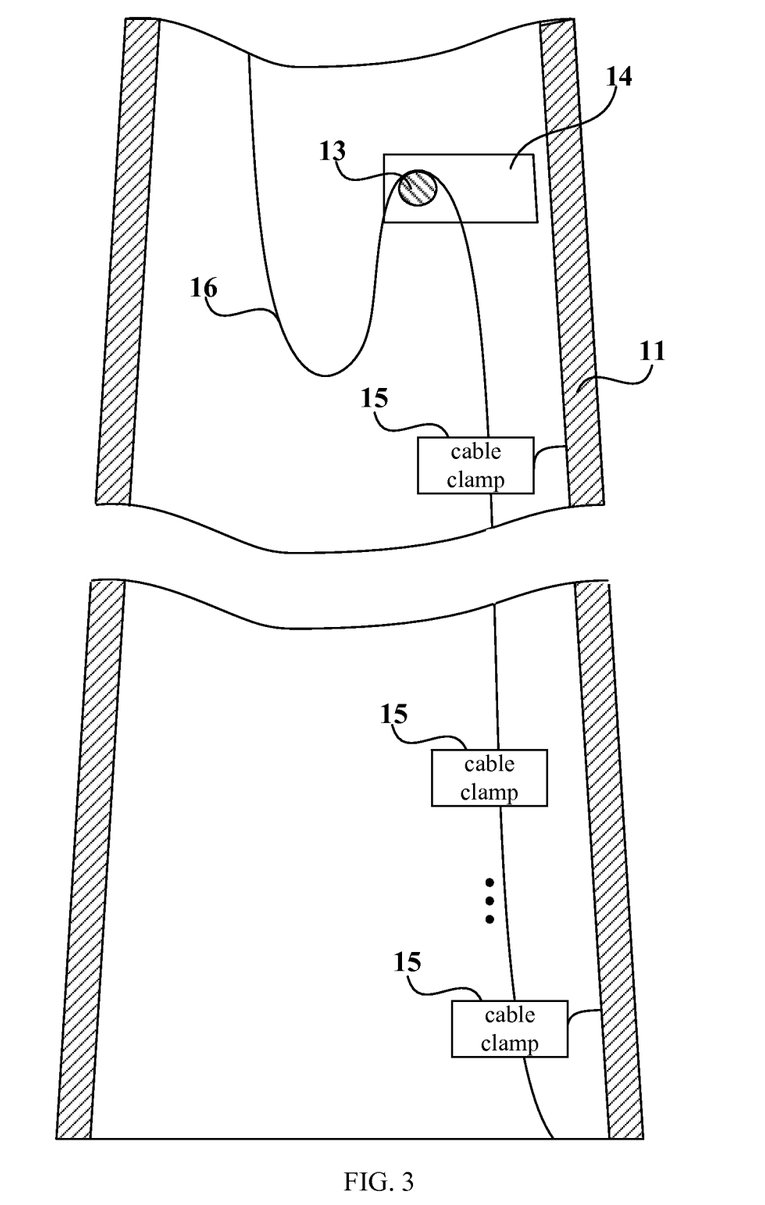
FIG. 3 schematically illustrates the tower barrel as illustrated in FIG. 2 holding a cable.

FIG. 1 schematically illustrates the configuration of a tower barrel for wind electric power generation according to an embodiment of the invention. FIG. 2 schematically illustrates the tower barrel as shown in FIG. 1 in the direction of AA. FIG. 3 schematically illustrates the tower barrel as shown in FIG. 2 holding a cable. The tower barrel comprises a barrel wall 11, a torsion cable direction-changing device 12 and cable clamps 15. The barrel wall 11 is used to support a wind turbine generator system. The torsion cable direction-changing device 12 is placed in the tower barrel and fixed on the barrel wall 11 for holding the cable 16 from the wind turbine generator system and restraining the torsion of the cable 16. The torsion cable direction-changing device 12 comprising a beam 13 and two supports 14 for supporting the beam 13. In the present embodiment, the beam 13 has a circular cross-section. The beam 13 also may have an elliptic cross-section. The supports 14 are fixed on the barrel wall 11. The cable clamps 15 are placed under the torsion cable direction-changing device 12 and connected to the barrel wall 11 for securing the cable 16. The cable 16, after wound with the beam 13, reaches the bottom of the tower barrel. The cable 16 at the bottom of the tower barrel may be fixed by the cable clamps 15 on the barrel wall 11.

In the present embodiment, a torsion cable direction-changing device 12 is provided in the tower barrel and the cable 16 hangs down by a certain length before wounded with the beam 13 in the torsion cable direction-changing device 12. Then except the gravity of the downward hanging part and the upward pulling forces of a wind turbine and the beam 13, no forces in any other directions are exerted on the cable 16. When the cable 16 twists as the yawing of the wind turbine occurs, only the downward hanging part of the cable before the beam 13 is twisted and deformed. Even when the wind turbine is in the extreme yawing position, only the tensile deformation of the downward hanging part of the cable 16 is the largest, and the torsion deformation of the cable is terminated at the beam 13, which not only can meet the requirements of the normal yawing of the wind turbine generator system, but also can not make the twisted cable to break due to too large tensile deformation, and so improves the safety of the wind turbine generator system.

Adjustment portions for adjusting the position of the beam may be provided on the supports 14. If the position of the beam is adjusted by the adjustment portions, the beam 13 may be placed at the front end of the supports 14, at the middle part of the supports 14, or at the tail end of the supports 14. The both ends of the beam 13 are connected to the adjustment portions. The adjustment portions may be long trough bodies or through holes.

When the adjustment portions are through holes, the number of the through holes is two, to improve the stability of the torsion cable direction-changing device 12.

The beam 13 may comprise a metal pipe and screw rods, a metal plate having a connecting hole is provided at both ends of the metal pipe. The metal pipe is sleeved on the screw rods, and the both ends of the screw rods are respectively fixed on the supports through the connecting holes. When the number of the through holes as the adjustment portions is two, the number of the screw rods is two accordingly.

The metal pipe may be a steel pipe or an iron pipe. When the metal pipe is an iron pipe, the metal plate is an iron plate. When the metal pipe is a steel pipe, the metal plate is a steel plate.

For the circumstances that a super large wind turbine generator system has more cables twisted together, which has a terrible effect on the heat dissipation, the dispersion of the cable layout should be fully considered. In such a situation, the number of the torsion cable direction-changing device 12 is plurality.

Figure 4:
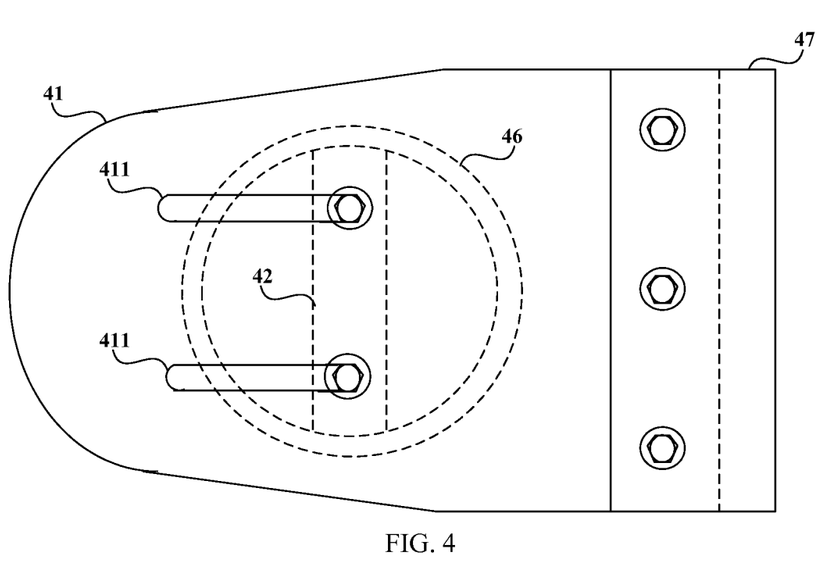
FIG. 4 schematically illustrates the configuration of a torsion cable direction-changing device in the tower barrel for wind electric power generation according to an embodiment of the invention.
Figure 5:
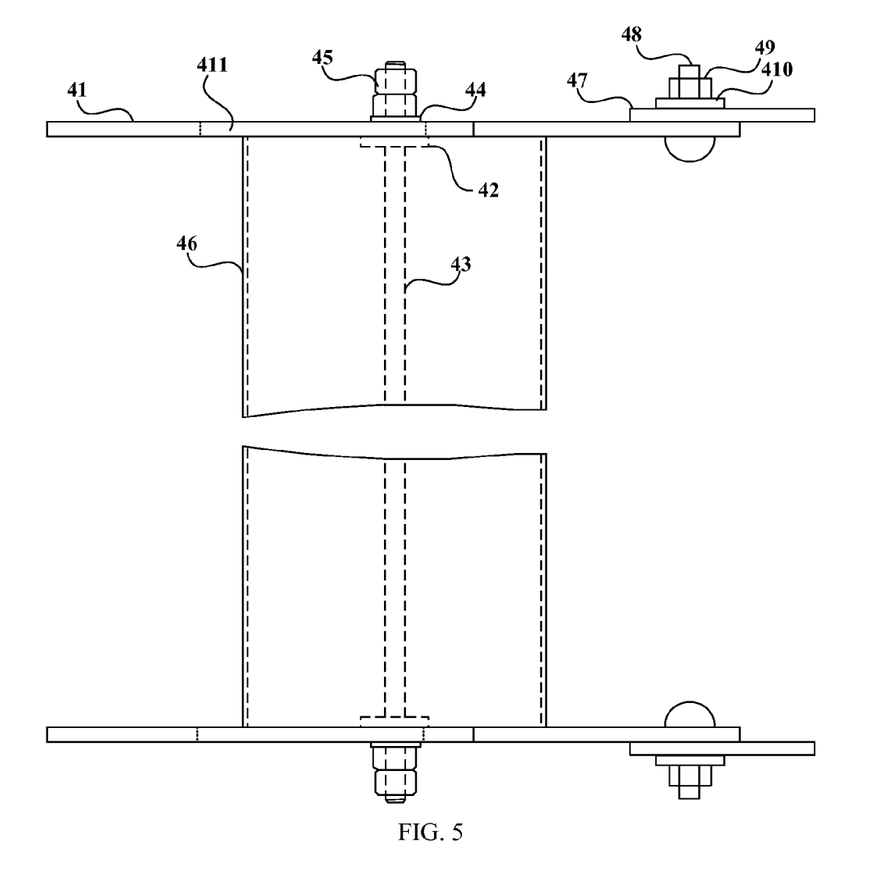
FIG. 5 is the top view of the torsion cable direction-changing device as shown in FIG. 4.

FIG. 4 schematically illustrates the configuration of a torsion cable direction-changing device in the tower barrel for wind electric power generation according to an embodiment of the invention. FIG. 5 is the top view of the torsion cable direction-changing device as shown in FIG. 4. The torsion cable direction-changing device comprising a position adjustable steel pipe 46, a screw rod 43, steel plates 41, steel plates 42, steel plates 47 and standard connectors 44, connectors 45, connectors 48, connectors 49 and connectors 410. The steel plate 41 and the steel plate 47 are connected to the barrel wall fixed to the tower barrel. Two through holes 411 for adjusting the position are provided on the steel plate 41. Circular holes are provided on the steel plate 42 for securing the screw rod 43 and connected to the steel plate 41 and/or the steel plate 47. Both ends of the steel pipe 46 are welded with the steel plates 42. The steel pipe 46 is sleeved on the screw rod 43 supported by the steel plate 42. The screw rod 43 is connected to the steel plate 41 by a round hole on the steel plate 42. The position of the steel pipe 46 can be adjusted from left to right to a suitable location by the through-holes 411 on the steel plate 41, and be secured by the connector 44, the connectors 45 and the screw rod 43.

Figure 6:
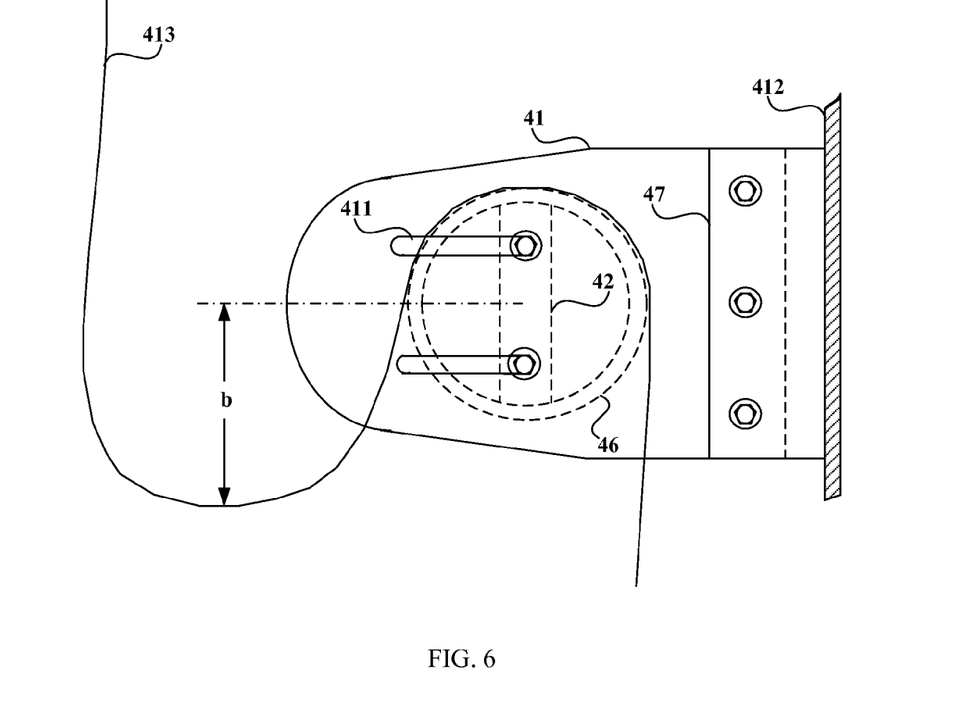
FIG. 6 schematically illustrates the torsion cable direction-changing device as shown in FIG. 4 and FIG. 5 when they are used.

FIG. 6 schematically illustrates the torsion cable direction-changing device as shown in FIG. 4 and FIG. 5 when they are used. As shown in FIG. 6, a yawing torsion cable direction-changing device is welded and fixed with the barrel wall 412 of the tower barrel by the steel plate 47. The downward hanging cable 413 from the wind turbine on the top of the tower barrel hangs down, wounded with the steel pipe 46 of the yawing torsion cable direction-changing device, to the bottom of the tower barrel. Then the downward hanging cable 413 is secured by the cable clamps connected with the barrel wall 412 of the tower barrel. The cable 413 hangs down by a certain length such as b before it is wound with the steel pipe 46 of the yawing torsion cable direction-changing device. This length b assures that under the condition that the tensile deformation of the cable 413 achieves largest when the wind turbine is in the extreme yawing position, no force is exerted on the cable 413 except the gravity thereof, which ensures the safety of the cable 413 when the wind turbine is yawing. The cable 413 may include power cables, control cables and so on.

For the super large wind turbine generator system above 3MW, because many cables are introduced from it, the tower barrel for wind electric power generation may include a plurality of torsion cable direction-changing devices.

Figure 7:
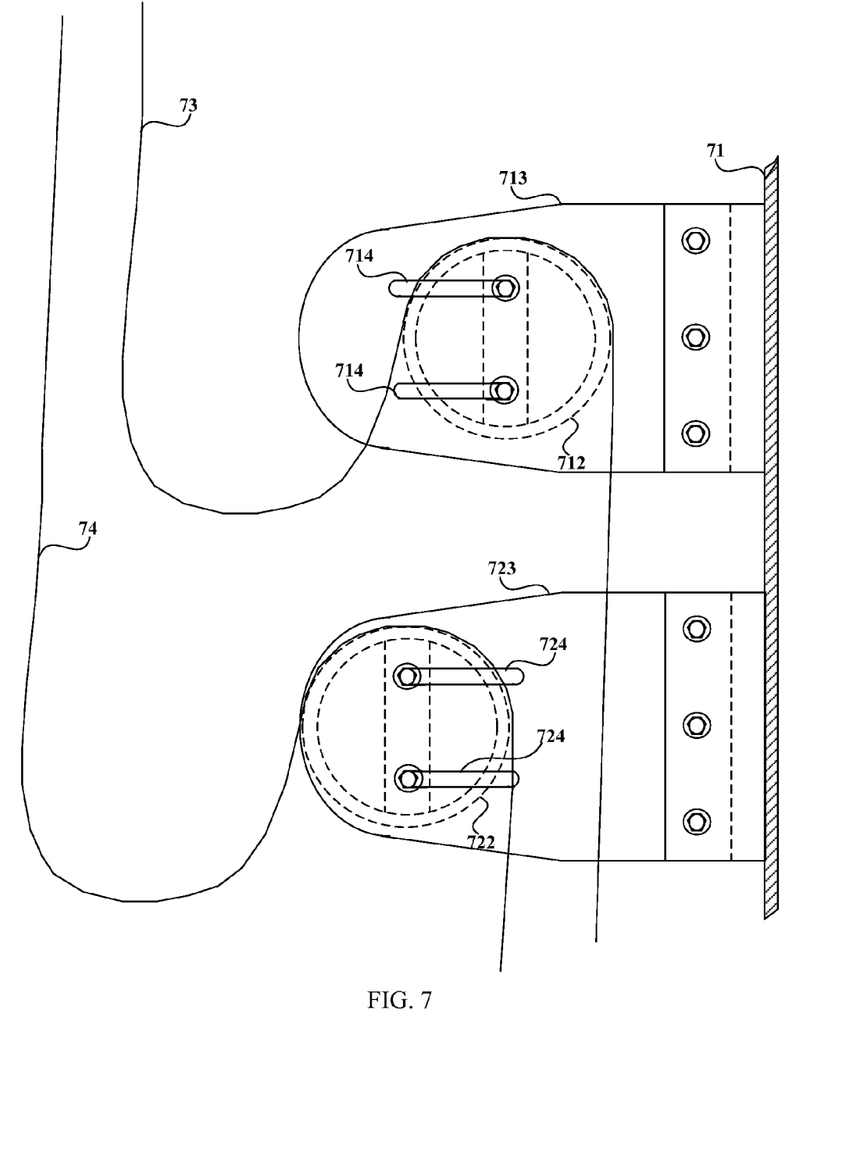
FIG. 7 schematically illustrates the configuration of another tower barrel for wind electric power generation according to an embodiment of the invention.

FIG. 7 schematically illustrates the configuration of another tower barrel for wind electric power generation according to an embodiment of the invention. In the embodiment, the tower barrel comprising two torsion cable direction-changing devices which are placed at different positions of the barrel wall 71.

The steel pipe 712 of the upper torsion cable direction-changing device is adjusted to the right extreme position of the through holes 714 provided on the steel plate 713, and the steel pipe 722 of the lower torsion cable direction-changing device is adjusted to the left extreme position of the through holes 724 provided on the steel plate 723. Downward hanging cables from the wind turbine on the top of the tower barrel can be divided into two sets: one set of cables 73 and the other set of cables 74. One set of cables 73 are wound with the upper torsion cable direction-changing device and the other set of cables 74 are wound with the lower torsion cable direction-changing device. The separated cables hang down to the bottom of the tower barrel and are secured by the double row cable clamps. Thus, by using two torsion cable direction-changing devices in combination, the problems of heat dissipation caused by too much and too dense cables are solved, which improves the safety of the cables meanwhile.

The wind tower for wind electric power generation provided by the embodiments of the present invention comprises a tower barrel which may be any one of the tower barrels provided by the foregoing embodiments.

The wind power plant further provided by the embodiments of the present invention comprises a wind turbine generator system, wherein the wind power plant further comprises the foregoing wind tower for supporting the wind turbine generator system. The wind tower may be any one of the wind towers provided by the foregoing embodiments.

In the foregoing embodiments, the torsion of the cables when the wind turbine is yawing is suppressed by the torsion cable direction-changing device of the tower barrel for wind electric power generation, which prevents the potential safety hazard of the break of the cables caused by the torsion, protects the cable effectively, prevents the wind turbine generator system from damage, and improves the safety of the wind turbine generator system. Furthermore, the structure of the torsion cable direction-changing device is simple, compact, convenient and easy to operate, and is conducive to extensive application.

Finally, it will be appreciated that the foregoing embodiments are illustrative of the technical solution of the present invention, but not restrictive. Although the present invention have been described by referring to the foregoing embodiments, the ordinary skilled person in the art should appreciate that modifications to the technical solution of the foregoing embodiments, or equivalences of some technical features could be made without departing from the spirit and scope of the claims of the present invention.

What is claimed is:

1. A tower barrel for wind electric power generation, characterized by comprising:
   a barrel wall for supporting a wind turbine generator system,
   a torsion cable direction-changing device which is placed in the tower barrel and fixed on the barrel wall for holding the cable from the wind turbine generator system and restraining the torsion of the cable, and
   cable clamps which are placed under the torsion cable direction-changing device and connected to the barrel wall for securing the cable,
   the torsion cable direction-changing device comprising a beam and two supports for supporting the beam, and the supports are fixed on the barrel wall, wherein the beam comprises a metal pipe and screw rods, a metal plate having a connecting hole is provided at both ends of the metal pipe, the metal pipe is sleeved on the screw rods, and the both ends of the screw rods are respectively fixed on the supports through the connecting holes.

2. The tower barrel for wind electric power generation as claimed in claim 1, characterized in that adjustment portions for adjusting the position of the beam are provided on the supports, and the both ends of the beam are connected to the adjustment portions.

3. The tower barrel for wind electric power generation as claimed in claim 1, characterized in that the beam has a circular or elliptic cross-section.

4. The tower barrel for wind electric power generation as claimed in claim 2, characterized in that the adjustment portions are through holes.

5. The tower barrel for wind electric power generation as claimed in claim 4, characterized in that the number of the through holes is two.

6. The tower barrel for wind electric power generation as claimed in claim 1, characterized in that the metal pipe is a steel pipe and the metal plate is a steel plate.

7. The tower barrel for wind electric power generation as claimed in claim 1, characterized in that the number of the screw rods is two.

8. The tower barrel for wind electric power generation as claimed in claim 1, characterized in that the number of the torsion cable direction-changing device is plurality.

9. A wind tower for wind electric power generation, characterized by comprising the tower barrel for wind electric power generation as claimed in claim 1.

10. A wind power plant comprising a wind turbine generator system, characterized in that the wind power plant further comprises the wind tower for wind electric power generation as claimed in claim 9 for supporting the wind turbine generator system.

11. The tower barrel for wind electric power generation as claimed in claim 2, characterized in that the number of the torsion cable direction-changing device is plurality.

12. The tower barrel for wind electric power generation as claimed in claim 3, characterized in that the number of the torsion cable direction-changing device is plurality.

13. The tower barrel for wind electric power generation as claimed in claim 4, characterized in that the number of the torsion cable direction-changing device is plurality.

14. The tower barrel for wind electric power generation as claimed in claim 5, characterized in that the number of the torsion cable direction-changing device is plurality.

* * * * *